United States Patent
Yamazaki (10) Patent No.: US 9,442,248 B2
(45) Date of Patent: Sep. 13, 2016

(54) POLARIZATION BEAM COMBINER/SPLITTER, POLARIZATION BEAM COMBINING/SPLITTING STRUCTURE, LIGHT MIXER, OPTICAL MODULATOR MODULE, AND METHOD FOR MANUFACTURING POLARIZATION BEAM COMBINER/SPLITTER

(71) Applicant: NEC CORPORATION, Tokyo (JP)

(72) Inventor: Hiroyuki Yamazaki, Otsuki (JP)

(73) Assignee: NEC CORPORATION, Tokyo (JP)

( * ) Notice: Subject to any disclaimer, the term of this patent is extended or adjusted under 35 U.S.C. 154(b) by 92 days.

(21) Appl. No.: 14/381,950

(22) PCT Filed: Nov. 15, 2012

(86) PCT No.: PCT/JP2012/007338
§ 371 (c)(1),
(2) Date: Aug. 28, 2014

(87) PCT Pub. No.: WO2013/136393
PCT Pub. Date: Sep. 19, 2013

(65) Prior Publication Data
US 2015/0016768 A1    Jan. 15, 2015

(30) Foreign Application Priority Data
Mar. 16, 2012 (JP) .................. 2012-060509

(51) Int. Cl.
*G02B 6/12* (2006.01)
*G02B 6/122* (2006.01)
(Continued)

(52) U.S. Cl.
CPC ............... *G02B 6/122* (2013.01); *G02B 6/126* (2013.01); *G02F 1/0136* (2013.01);
(Continued)

(58) Field of Classification Search
None
See application file for complete search history.

(56) References Cited

U.S. PATENT DOCUMENTS 5,195,152 A    3/1993    Gupta
5,499,307 A *  3/1996    Iwatsuka .............. G02B 6/272
                                                  359/484.03
(Continued)

FOREIGN PATENT DOCUMENTS

JP    2-18525 A    1/1990
JP    3-33726 A    2/1991
(Continued)

OTHER PUBLICATIONS

Machine translation of JP10221555A, Sugimoto et al, Aug. 21, 1998.*

(Continued)

Primary Examiner — Hemang Sanghavi
(74) Attorney, Agent, or Firm — McGinn IP Law Group, PLLC.

(57) ABSTRACT

The present invention provides a polarization beam combiner/splitter, a polarization beam combining/splitting structure, a light mixer, an optical modulator module, and a method for manufacturing a polarization beam combiner/splitter with suitable polarization beam combining/splitting characteristics. In the polarization beam combiner/splitter, a polarization beam combining/splitting film is placed on a substrate and allows TE light to pass through and causes TM light to branch off. A first optical waveguide is formed on the substrate with an end surface facing a first surface of the polarization beam combining/splitting film and with a waveguide direction coinciding with a propagation direction of the TE light. A second optical waveguide is formed on the substrate with an end surface facing a second surface of the polarization beam combining/splitting film and with a waveguide direction coinciding with a propagation direction of the TM light.

16 Claims, 7 Drawing Sheets

(51) Int. Cl.
*H04B 10/556* (2013.01)
*H04B 10/67* (2013.01)
*G02B 6/126* (2006.01)
*G02F 1/01* (2006.01)
*H04B 10/61* (2013.01)
*G02B 6/27* (2006.01)
*G02B 6/42* (2006.01)

(52) U.S. Cl.
CPC ......... *H04B 10/556* (2013.01); *H04B 10/614* (2013.01); *H04B 10/677* (2013.01); *G02B 6/2706* (2013.01); *G02B 6/2726* (2013.01); *G02B 6/4213* (2013.01); *G02B 2006/12166* (2013.01); *G02F 2001/0144* (2013.01); *Y10T 29/49826* (2015.01)

(56) References Cited

U.S. PATENT DOCUMENTS

| 5,923,795 | A | 7/1999 | Toyohara | |
|---|---|---|---|---|
| 6,559,921 | B1* | 5/2003 | Leslie | G02F 1/1326 349/196 |
| 2005/0078913 | A1 | 4/2005 | Blauvelt et al. | |
| 2010/0260504 | A1 | 10/2010 | Takahara | |
| 2011/0026935 | A1* | 2/2011 | Akiyama | H04B 10/5053 398/184 |
| 2012/0063716 | A1* | 3/2012 | Mizuno | G02B 6/12007 385/11 |

FOREIGN PATENT DOCUMENTS

| JP | 4-56818 A | 2/1992 |
|---|---|---|
| JP | 5-158096 A | 6/1993 |
| JP | 5-217194 A | 8/1993 |
| JP | 6-95050 A | 4/1994 |
| JP | H 09-43448 A | 2/1997 |
| JP | H09-96731 A | 4/1997 |
| JP | 10-221555 A | 8/1998 |
| JP | 2000-147311 A | 5/2000 |
| JP | 2006-520006 A | 8/2006 |
| JP | 2010-4982 A | 1/2010 |
| JP | 2010-251851 A | 11/2010 |
| JP | 2012-4982 A | 1/2012 |
| WO | WO 2011/027895 A1 | 3/2011 |

OTHER PUBLICATIONS

International Search Report (ISR) (PCT Form PCT/ISA/210), in PCT/JP2012/007338, dated Jan. 29, 2013.

N. Keil, et al., "Polymer PLC as an Optical Integration Bench" Technical Digest of OFC 2011, OWM1.

T. Oguchi et al., "Integrated Polarization Diversity Front End Optics", IEEE Photonics Technology Letters, Nov. 1990, vol. 2, No. 11, p. 830-831.

Japanese Office Action dated Jul. 21, 2015 with a partial English translation thereof.

* cited by examiner

POLARIZATION BEAM COMBINER/SPLITTER, POLARIZATION BEAM COMBINING/SPLITTING STRUCTURE, LIGHT MIXER, OPTICAL MODULATOR MODULE, AND METHOD FOR MANUFACTURING POLARIZATION BEAM COMBINER/SPLITTER

TECHNICAL FIELD

The present invention relates to a polarization beam combiner/splitter, a polarization beam combining/splitting structure, a light mixer, an optical modulator module, and a method for manufacturing a polarization beam combiner/splitter and, for example, relates to a polarization beam combiner/splitter, a polarization beam combining/splitting structure, a light mixer, an optical modulator module, and a method for manufacturing a polarization beam combiner/splitter applied to an optical communication system.

BACKGROUND ART

With an increase in the transmission rate of an optical communication system, intensive studies have been conducted on a communication system capable of effective high-capacity high-speed communication. Particularly, DP-QPSK (Dual-polarization Quadra phase shift keying) is most likely to be employed in a 100GE (100 Gigabit Ethernet (Ethernet: registered trademark) transmission device.

In 100GE, a DP-QPSK signal is received by a receiver, and an optical signal contained in the received DP-QPSK signal is separated by polarization and phase. Then, each of the optical signals separated by polarization and phase is converted from optical to electrical signals. Further, the electrical signals generated by opto-electric conversion are A-D converted to obtain digital signals. The receiver that receives such a DP-QPSK signal is already proposed (Patent Literature 1).

In the polarization beam splitting by the receiver described above, the DP-QPSK signal is split by polarization into a TE signal and a TM signal. Accordingly, a device and an element to perform polarization beam splitting are required. As an element to perform polarization beam splitting, an element that splits light entering a waveguide optical device by polarization using the birefringence phenomenon is proposed, for example (Patent Literature 2).

Currently, in 100GE, discussions on various types of MSA (Multi-Source Agreement) are taking place. For example, to make the receiving module compliant with MSA, incorporation of a polarization beam splitting element, a 90° hybrid interferometer, a PD (Photo Diode) and a TIA (Trans Impedance Amplifier) into a 75 mm×35 mm housing is under consideration.

There are several methods for incorporating a polarization beam splitting element for polarization beam splitting, such as integrating a polarization beam splitting element onto an optical circuit board, incorporating a polarization beam splitting element into a module using micro-optics technology, and placing a polarization beam splitting element outside a module.

Figure 7:
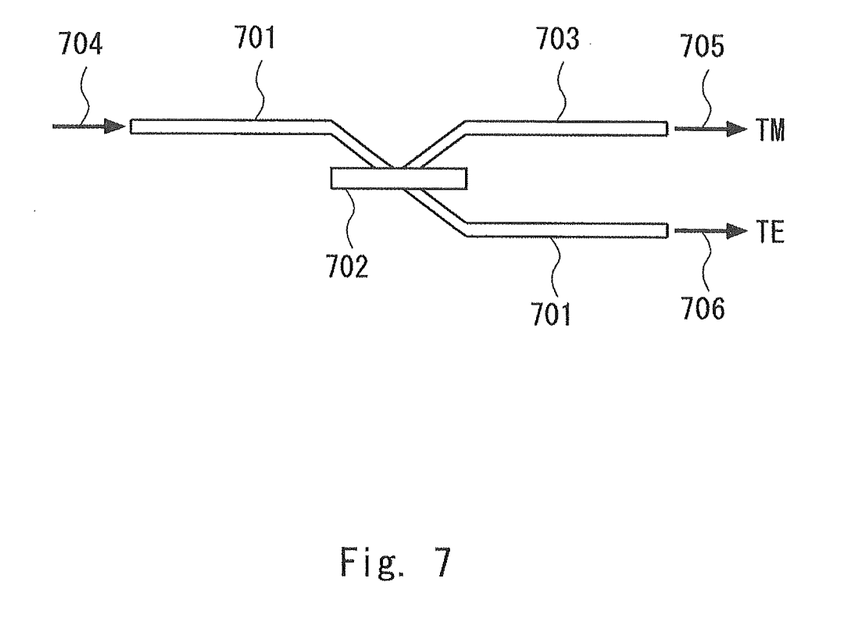
FIG. 7 is a diagram showing positions of an optical waveguide and a polarization beam splitting film in the case of carrying out polarization beam splitting by inserting the polarization beam splitting film into the optical waveguide.

Further, a method that inserts a polarization beam splitting film into an optical waveguide is proposed (Non Patent Literature 1). FIG. 7 is a diagram showing positions of an optical waveguide and a polarization beam splitting film in the case of carrying out polarization beam splitting by inserting the polarization beam splitting film into the optical waveguide. An optical waveguide 701 is cut at the position where a polarization beam splitting film 702 is inserted. At the position where the optical waveguide 701 is cut, the polarization beam splitting film 702 is inserted.

The reflection characteristics and the transmission characteristics of the polarization beam splitting film 702 vary depending on a difference in the polarization state of incident light 704. Specifically, the polarization beam splitting film 702 transmits a TE component 706 of the incident light 704 and reflects a TM component 705. As a result, the TE component 706 of the incident light 704 propagates through the optical waveguide 701 as it is. On the other hand, the TM component 705 of the incident light 704 is reflected and propagates through an optical waveguide 703. The optical waveguide 701 is thereby split by polarization into the TE component 706 and the TM component 705.

CITATION LIST

Patent Literature

PTL1: Japanese Unexamined Patent Application Publication No. H05-158096
PTL2: Japanese Unexamined Patent Application Publication No. H09-96731

Non Patent Literature

NPL1: N. Keil, et al., "Polymer PLC as an Optical Integration Bench" Technical Digest of OFC 2011, OWM1

SUMMARY OF INVENTION

Technical Problem

However, the inventor has found that there is a problem in the polarization beam splitting scheme shown in FIG. 7. This scheme has an advantage that the polarization beam splitting film 702 can be easily inserted into the optical waveguide. However, the optical waveguide is cut at the position where the polarization beam splitting film 702 is inserted. As a result, diffraction occurs at the cut position of the optical waveguide, which causes a diffraction loss. Further, the diffraction causes an increase in the incident angle to the polarization beam splitting film 702, which results in deterioration of the polarization beam splitting characteristics and degradation of the polarization extinction ratio.

The present invention has been accomplished to solve the above problems and an exemplary object of the present invention is thus to provide a polarization beam combiner/splitter, a polarization beam combining/splitting structure, a light mixer, an optical modulator module, and a method for manufacturing a polarization beam combiner/splitter with low losses and suitable polarization beam combining/splitting characteristics.

Solution to Problem

A polarization beam combiner/splitter according to an exemplary aspect of the present invention includes a substrate, a polarization beam combining/splitting film placed on the substrate, for allowing a first polarization signal to pass through and causing a second polarization signal having a different polarization plane from the first polarization signal to branch off, a first optical waveguide placed on the substrate, with an end surface facing a first surface of the polarization beam combining/splitting film and with a waveguide direction coinciding with a propagation direction of the first polarization signal, and a second optical waveguide placed on the substrate, with an end surface facing a second surface on an opposite side of the first surface of the polarization beam combining/splitting film and with a waveguide direction coinciding with a propagation direction of the second polarization signal.

A light mixer according to an exemplary aspect of the present invention includes a first polarization beam combiner/splitter for splitting incident focused polarization multiplexed signal light by polarization into a first polarization signal and a second polarization signal having a different polarization plane from each other, and an optical interferometer for separating the first polarization signal and the second polarization signal by phase, and the first polarization beam combiner/splitter includes a substrate, a first polarization beam combining/splitting film placed on the substrate, for allowing the first polarization signal to pass through and causing the second polarization signal to branch off, a first optical waveguide placed on the substrate and connected to the optical interferometer, with an end surface facing a first surface of the first polarization beam combining/splitting film and with a waveguide direction coinciding with a propagation direction of the first polarization signal, and a second optical waveguide placed on the substrate and connected to the optical interferometer, with an end surface facing a second surface on an opposite side of the first surface of the first polarization beam combining/splitting film and with a waveguide direction coinciding with a propagation direction of the second polarization signal.

An optical modulator module according to an exemplary aspect of the present invention includes an optical modulation unit for modulating and outputting a first polarization signal and a second polarization signal having a different polarization plane from each other, and a polarization beam combiner/splitter for combining the first polarization signal and the second polarization signal, and the polarization beam combiner/splitter includes a substrate, a polarization beam combining/splitting film placed on the substrate, for allowing the first polarization signal output from the optical modulation unit to pass through and causing the second polarization signal to branch off, a first optical waveguide placed on the substrate and connected to the optical modulation unit, with an end surface facing a first surface of the polarization beam combining/splitting film and with a waveguide direction coinciding with a propagation direction of the first polarization signal, and a second optical waveguide placed on the substrate and connected to the optical modulation unit, with an end surface facing a second surface on an opposite side of the first surface of the polarization beam combining/splitting film and with a waveguide direction coinciding with a propagation direction of the second polarization signal, and the first and second optical waveguides are placed so that an optical axis of the first polarization signal having passed through the polarization beam combining/splitting film and an optical axis of the second polarization signal reflected by the polarization beam combining/splitting film coincide with each other.

A method for manufacturing a polarization beam combiner/splitter according to an exemplary aspect of the present invention includes forming a first optical waveguide with an end surface facing a first surface of a polarization beam combining/splitting film for allowing a first polarization signal to pass through and causing a second polarization signal having a different polarization plane from the first polarization signal to branch off and with a waveguide direction coinciding with a propagation direction of the first polarization signal on a substrate prior to placing the polarization beam combining/splitting film, forming a second optical waveguide with an end surface facing a second surface on an opposite side of the first surface of the polarization beam combining/splitting film and with a waveguide direction coinciding with a propagation direction of the second polarization signal on the substrate prior to placing the polarization beam combining/splitting film, and placing the polarization beam combining/splitting film on the substrate.

Advantageous Effects of Invention

According to exemplary embodiments of the present invention, it is possible to provide a polarization beam combiner/splitter, a polarization beam combining/splitting structure, a light mixer, an optical modulator module, and a method for manufacturing a polarization beam combiner/splitter with suitable polarization beam combining/splitting characteristics.

DESCRIPTION OF EMBODIMENTS

Exemplary embodiments of the present invention will be described hereinafter with reference to the drawings. In the drawings, the identical elements are denoted by the identical reference symbols, and the redundant explanation thereof is omitted.

First Exemplary Embodiment

Figure 1:
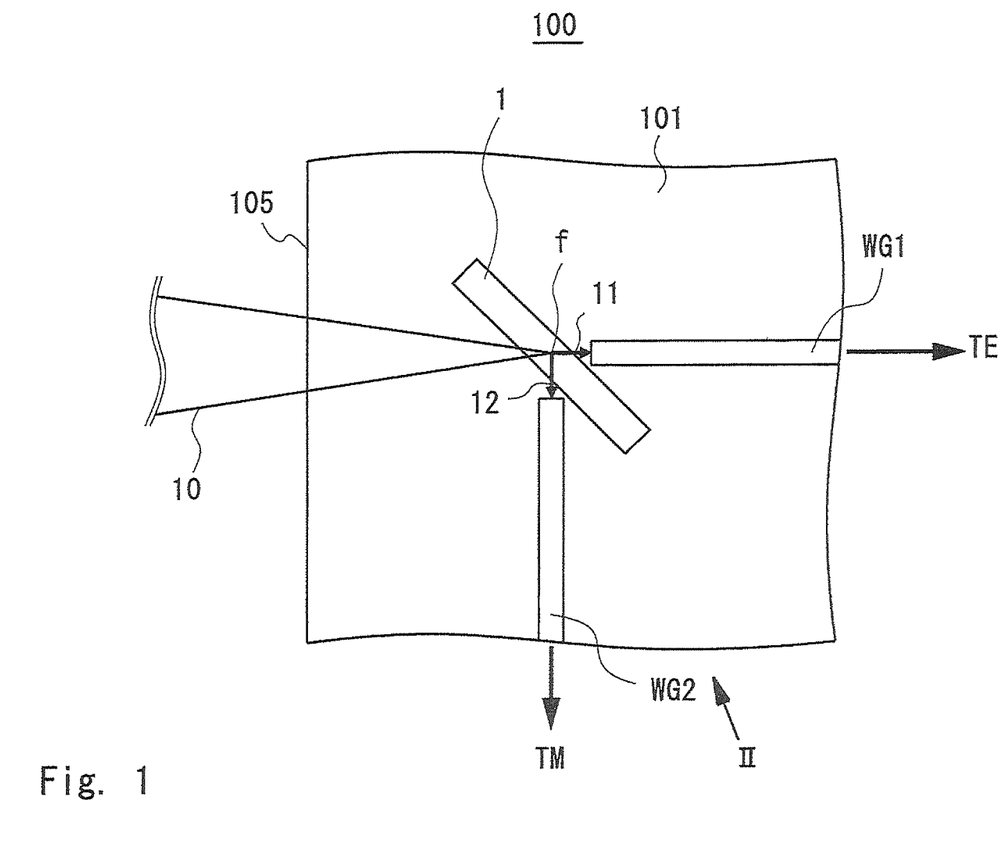
FIG. 1 is a diagram schematically showing a plan configuration of a polarization beam combiner/splitter 100 according to a first exemplary embodiment.

A polarization beam combiner/splitter 100 according to a first exemplary embodiment of the invention is described hereinafter. FIG. 1 is a diagram schematically showing a plane configuration of the polarization beam combiner/splitter 100 according to the first exemplary embodiment. The polarization beam combiner/splitter 100 includes a polarization beam combining/splitting film 1 and optical waveguides WG1 and WG2.

The case where the polarization beam combiner/splitter 100 is used as a polarization beam splitter is described as an example. The end surface of the optical waveguide WG1 is joined to the polarization beam combining/splitting film 1 or placed in close proximity to the polarization beam combining/splitting film 1. Likewise, the end surface of the optical waveguide WG2 is joined to the polarization beam combining/splitting film 1 or placed in close proximity to the polarization beam combining/splitting film 1. Note that, as described later, the optical waveguides WG1 and WG2 are formed on a substrate 101.

Light 10 that is focused by a focusing means such as a lens, for example, enters the polarization beam combining/splitting film 1 through an incident end surface 105. The light 10 is focused within a specified distance from the end surface of the optical waveguide WG1 and the end surface of the optical waveguide WG2. Then, the light 10 is split into TE light 11 and TM light 12 by the polarization beam combining/splitting film 1.

The TE light 11 transmits through the polarization beam combining/splitting film 1 and enters the optical waveguide WG1. Because a focal point f of the light 10 is within a specified distance from the end surface of the optical waveguide WG1, the TE light 11 enters the optical waveguide WG1 as a focused beam. The TE light 11 can be thereby optically coupled with the optical waveguide WG1 with a low loss.

The TM light 12 is reflected by the polarization beam combining/splitting film 1 and enters the optical waveguide WG2. Because a focal point f of the light 10 is within a specified distance from the end surface of the optical waveguide WG2, the TM light 12 enters the optical waveguide WG2 as a focused beam. The specified distance is a distance where the focal area of a focused beam falls within the end surface of the optical waveguide WG1. The TM light 12 can be thereby optically coupled with the optical waveguide WG2 with a low loss.

Figure 2:
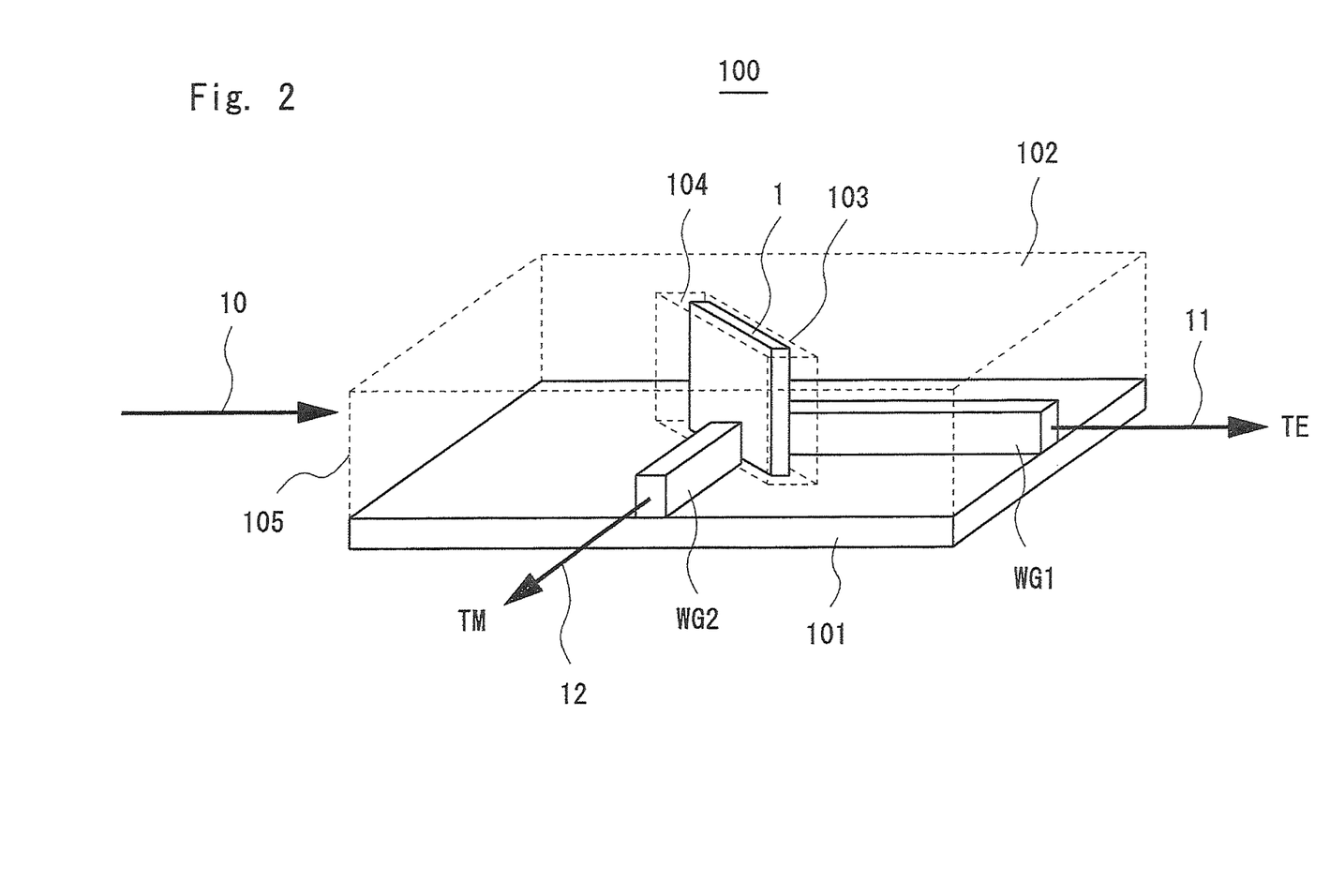
FIG. 2 is a perspective view schematically showing a configuration of the polarization beam combiner/splitter 100 according to the first exemplary embodiment.

A three-dimensional configuration of the polarization beam combiner/splitter 100 is described hereinbelow. FIG. 2 is a perspective view schematically showing a configuration of the polarization beam combiner/splitter 100 according to the first exemplary embodiment. FIG. 2 is a perspective view of the polarization beam combiner/splitter 100 when looking down in the direction II of FIG. 1. The optical waveguides WG1 and WG2 are formed on the substrate 101 by CVD (Chemical Vapor Deposition), for example. The substrate 101 is a silicon substrate, for example. The optical waveguides WG1 and WG2 are made of SiO2, for example.

On the optical waveguides WG1 and WG2 and the substrate 101, a cladding layer 102 is formed. In FIG. 2, the cladding layer 102 is shown by a dotted line to make the figure easily understandable. Core layers of the optical waveguides WG1 and WG2 have a refractive index that is approximately 1.5% higher than the cladding layer 102, and light is thereby confined in the two-dimensional direction.

The cladding layer 102 has a space 103 at the position to place the polarization beam combining/splitting film 1. The space 103 is larger in size than the polarization beam combining/splitting film 1 so that the polarization beam combining/splitting film 1 can be placed inside. The space 103 is formed by etching such as the Bosch process, for example. Further, the space 103 has a depth that reaches the substrate 101 from the upper surface of the cladding layer 102, for example. The depth of the space 103 is 150 μm, for example.

The polarization beam combining/splitting film 1 is fitted inside the space 103. A gap 104 between the polarization beam combining/splitting film 1 and the side surface of the space 103 is filled with an adhesive agent having a refractive index consistent with the effective refractive index of the optical waveguides WG1 and WG2, for example. The polarization beam combining/splitting film 1 is thereby fixed. In this state, the light 10 is incident on the incident end surface 105.

Accordingly, in the polarization beam combiner/splitter 100, because the light 10 is focused near the end surfaces of the optical waveguides WG1 and WG2, diffraction of the light 10 can be minimized. A diffraction loss can be thereby reduced. In addition, because the light 10 can enter the polarization beam combining/splitting film 1 in the form of near collimated light, polarization beam splitting characteristics can be further improved.

Further, in the polarization beam combiner/splitter 100, by optimizing the incident position of the light 10 by optical axis adjustment, it is possible to equalize the intensity of the TE light and the intensity of the TM light after polarization beam splitting. This is the advantageous effect achieved first by the polarization beam combiner/splitter 100, which cannot be achieved by the method of inserting a polarization beam splitting film into an optical wave guide.

Although the polarization beam combining/splitting film 1 that transmits the TE light 11 and reflects the TM light 12 is described in this example, the same polarization beam splitting operation can be attained in the polarization beam combining/splitting film 1 that reflects the TE light 11 and transmits the TM light 12.

Second Exemplary Embodiment

Figure 3:
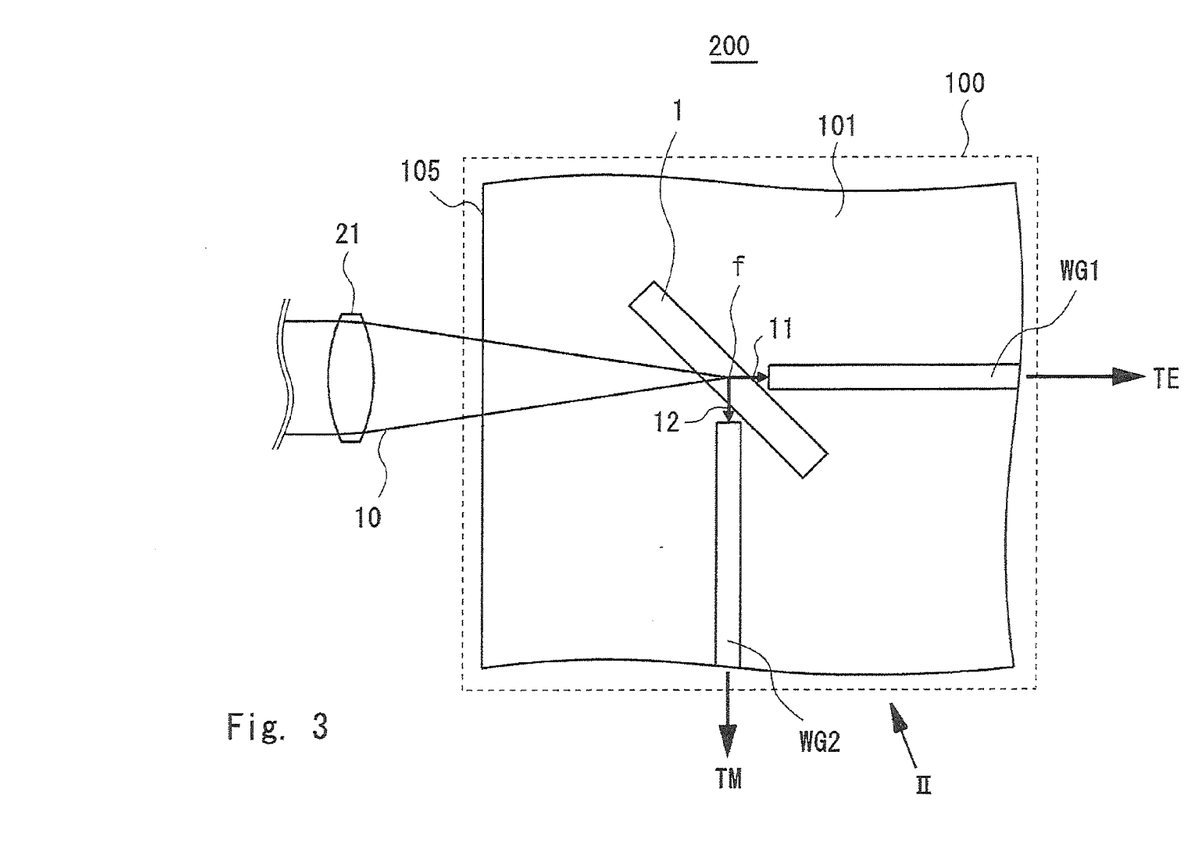
FIG. 3 is a diagram schematically showing a plan configuration of a polarization beam combining/splitting structure 200 according to a second exemplary embodiment.

A polarization beam combining/splitting structure 200 according to a second exemplary embodiment of the invention is described hereinafter. FIG. 3 is a diagram schematically showing a plan configuration of the polarization beam combining/splitting structure 200 according to the second exemplary embodiment. The polarization beam combining/splitting structure 200 has a structure in which a lens 21, which is a focusing means, is added to the polarization beam combiner/splitter 100 according to the first exemplary embodiment.

The lens 21 focuses the light 10 from the outside as shown in FIG. 3. The focused light 10 can be thereby incident on the polarization beam combining/splitting film 1 as described in the first exemplary embodiment.

Note that, although the lens 21 is a biconvex lens in the example of FIG. 3, a lens other than the biconvex lens can be used as a matter of course. Further, another optical component such as a concave mirror, not limited to the lens, can be used as a focusing means as long as it can focus the light 10.

Third Exemplary Embodiment

Figure 4:
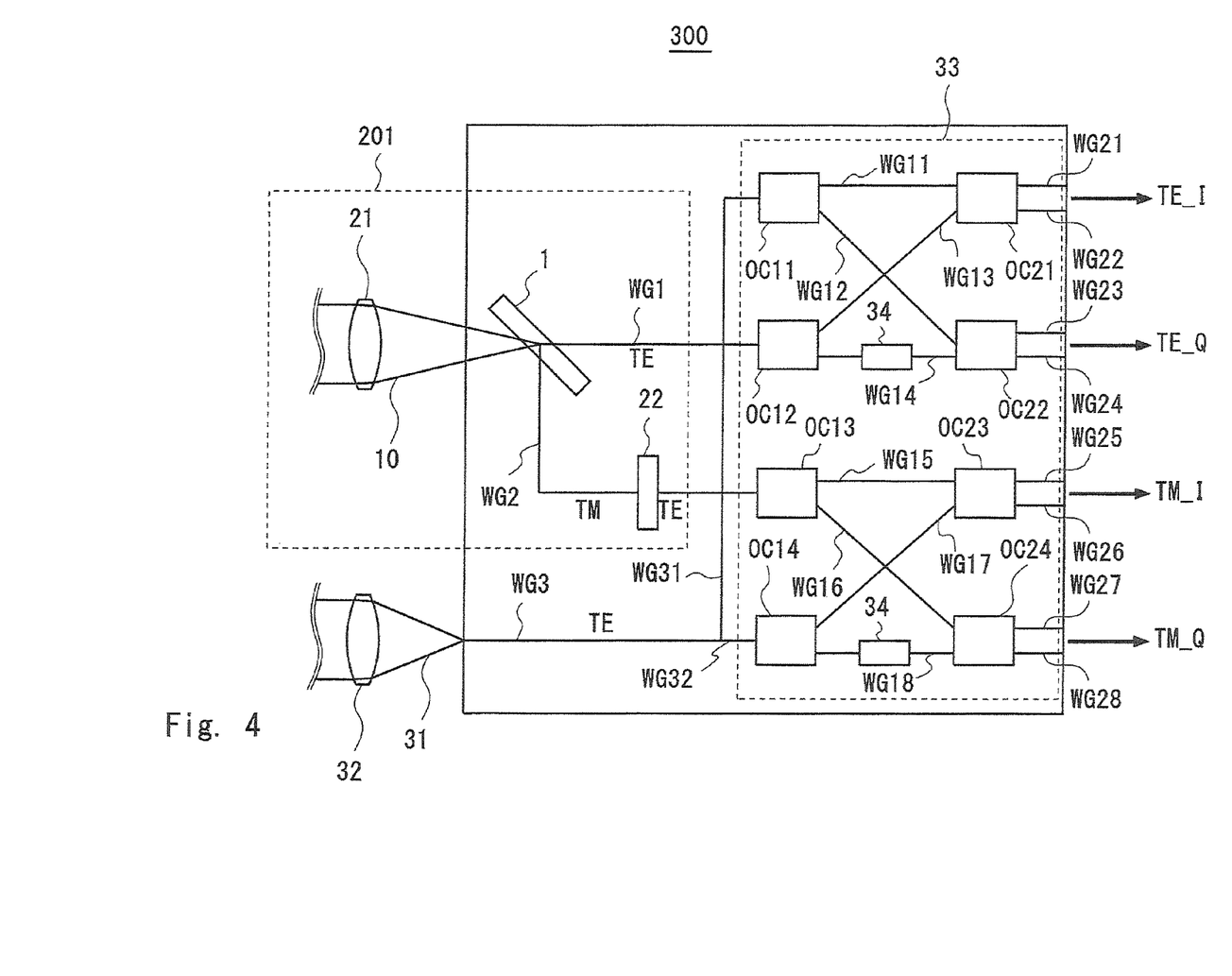
FIG. 4 is a diagram schematically showing a plan configuration of a light mixer 300 according to a third exemplary embodiment.

A light mixer 300 according to a third exemplary embodiment of the invention is described hereinafter. FIG. 4 is a diagram schematically showing a plan configuration of the light mixer 300 according to the third exemplary embodiment. The light mixer 300 carries out polarization beam splitting and phase separation of a DP-QPSK signal. In the following description, the light 10 is a DP-QPSK signal. The light mixer 300 includes a polarization beam combining/splitting structure 201, a lens 32, an interference unit 33, and optical waveguides WG3, WG31 and WG32. Note that, in FIG. 4, the optical waveguides WG3, WG31 and WG32 are schematically shown by lines.

The interference unit 33 includes optical couplers OC11 to OC14 and OC21 to OC24 and optical waveguides WG10 to WG18 and WG21 to WG28. Note that, in FIG. 4, the optical waveguides WG10 to WG18 and WG21 to WG28 are schematically shown by lines.

The optical couplers OC11 to OC14 are so-called directional couplers, Y-branch waveguides and the like, and they split light into two beams and output the split light in phase from each of their two output ports. The optical couplers OC21 to OC24 are so-called optical directional couplers, and outputs light generated by combining two light beams out of phase with each other from each of their two output ports.

One of the output ports of the optical coupler OC11 is connected to one of the input ports of the optical couplers OC21 through the optical waveguide WG11. Further, the other one of the output ports of the optical coupler OC11 is connected to one of the input ports of the optical couplers OC22 through the optical waveguide WG12. One of the output ports of the optical coupler OC12 is connected to the other one of the input ports of the optical coupler OC21 through the optical waveguide WG13. Further, the other one of the output ports of the optical coupler OC12 is connected to the other one of the input ports of the optical couplers OC22 through the optical waveguide WG14.

One of the output ports of the optical coupler OC13 is connected to one of the input ports of the optical couplers OC23 through the optical waveguide WG15. Further, the other one of the output ports of the optical coupler OC13 is connected to one of the input ports of the optical couplers OC24 through the optical waveguide WG16. One of the output ports of the optical coupler OC14 is connected to the other one of the input ports of the optical couplers OC23 through the optical waveguide WG17. Further, the other one of the output ports of the optical coupler OC14 is connected to the other one of the input ports of the optical couplers OC24 through the optical waveguide WG18.

Note that the optical waveguides WG14 and WG18 have a phase delay means 34 that delays the phase of light by $\pi/2$. To delay the phase of light by $\pi/2$, the optical path length of the optical waveguide is set to be ¼ longer than the wavelength of the light, for example.

The two output ports of the optical coupler OC21 are connected to the optical waveguides WG21 and WG22, respectively. The two output ports of the optical coupler OC22 are connected to the optical waveguides WG23 and WG24, respectively. The two output ports of the optical coupler OC23 are connected to the optical waveguides WG25 and WG26, respectively. The two output ports of the optical coupler OC24 are connected to the optical waveguides WG27 and WG28, respectively.

The polarization beam combining/splitting structure 201 has a structure in which a half-wave plate ($\lambda/2$ plate) 22 is added to the polarization beam combining/splitting structure 200 according to the second exemplary embodiment. The optical waveguide WG1 is connected to the input port of the optical coupler OC12. The optical waveguide WG2 is connected to the input port of the optical coupler OC13. The half-wave plate 22 is inserted into the optical waveguide WG2 between the polarization beam combining/splitting film 1 and the input of the optical coupler OC13. In FIG. 4, the optical waveguides WG1 and WG2 are schematically shown by lines.

The polarization beam combining/splitting structure 201 splits the light 10 by polarization into the TE light 11 and the TM light 12. The TE light 11 is input to the optical coupler OC12. The TM light 12 is converted into TM light 13 by the half-wave plate 22. The TM light 13 is input to the optical coupler OC13.

Local light 31 enters the optical waveguide WG3 from the outside via the lens 32. As the local light 31, a TE component of light output from an external LD (Laser Diode) is used, for example. The optical waveguide WG3 branches off into the optical waveguides WG31 and WG32. The optical waveguide WG31 is connected to the input port of the optical coupler OC11. The optical waveguide WG32 is connected to the input port of the optical coupler OC14. Thus, the local light 31, which is the TE light, enters the optical couplers OC11 and OC14.

As a result, in the interference unit 33, TE_I(0°), which is the in-phase (I) component of the QPSK signal contained in the TE component of the light 10, is output from the optical waveguide WG21 or WG22. TE_Q(90°), which is the quadrature-phase (Q) component of the QPSK signal contained in the TE component of the light 10, is output from the optical waveguide WG23 or WG24. Further, TM_I(0°), which is the I component of the QPSK signal contained in the TM component of the light 10, is output from the optical waveguide WG25 or WG26. TM_Q(90°), which is the Q component of the QPSK signal contained in the TM component of the light 10, is output from the optical waveguide WG27 or WG28.

As described above, in this configuration, suitable polarization beam splitting is done with a low loss, and it is thereby possible to achieve a highly efficient light mixer with a low loss and a high polarization extinction ratio. Further, because the polarization beam splitting structure and the interferometer can be integrally formed on the substrate, size reduction can be attained.

Fourth Exemplary Embodiment

Figure 5:
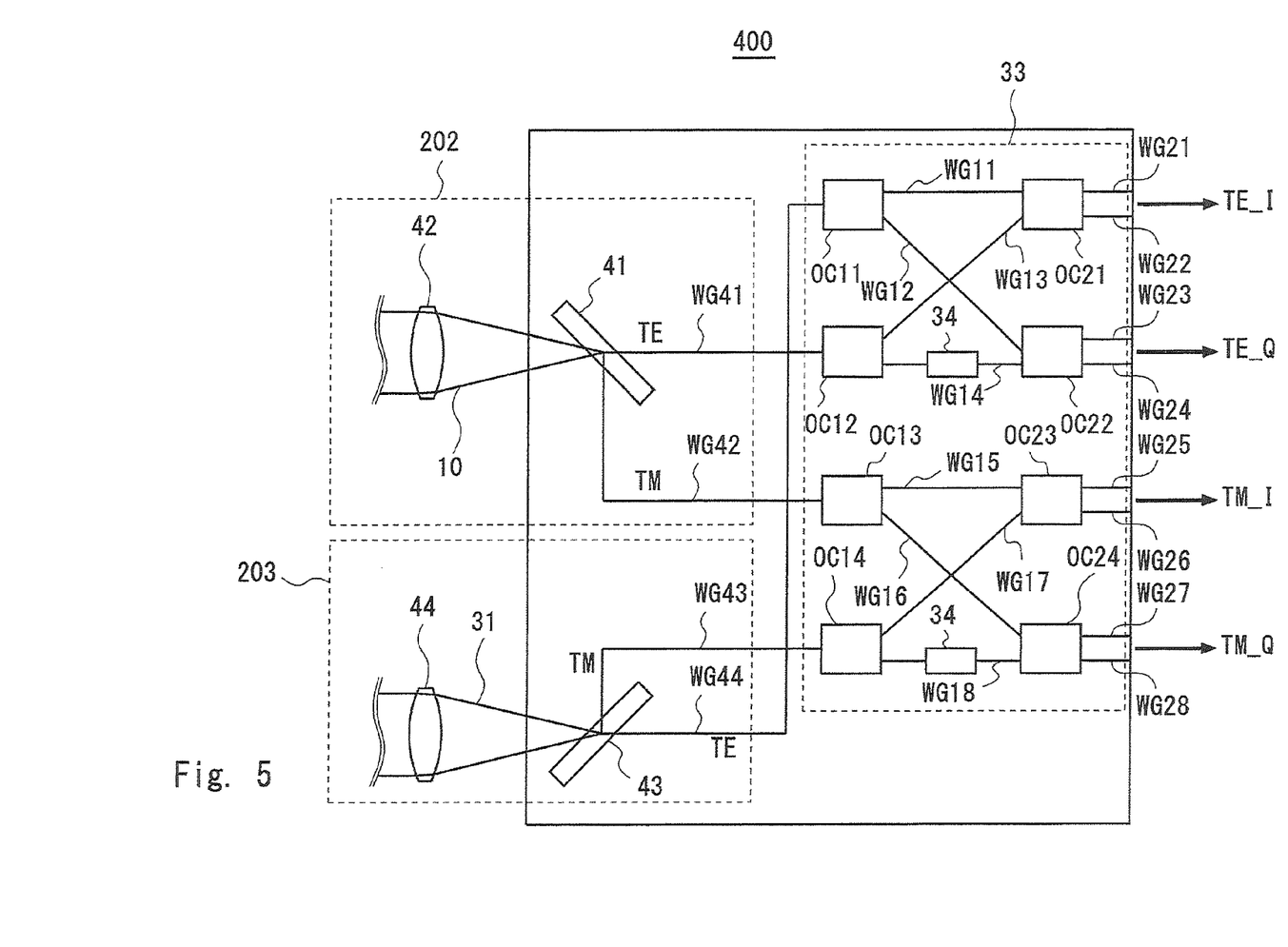
FIG. 5 is a diagram schematically showing a plan configuration of a light mixer 400 according to a fourth exemplary embodiment.

A light mixer 400 according to a fourth exemplary embodiment of the invention is described hereinafter. FIG. 5 is a diagram schematically showing a plan configuration of the light mixer 400 according to the fourth exemplary embodiment. The light mixer 400 carries out polarization beam splitting and phase separation of a DP-QPSK signal. In the following description, the light 10 is a DP-QPSK signal. The light mixer 400 includes polarization beam combining/splitting structures 202 and 203 and an interference unit 33.

The interference unit 33 is the same as that of the third exemplary embodiment and thus not redundantly described.

The polarization beam combining/splitting structures 202 and 203 have the same structure as the polarization beam combining/splitting structure 200 according to the second exemplary embodiment.

The polarization beam combining/splitting structure 202 includes a polarization beam combining/splitting film 41 and optical waveguides WG41 and WG42. The polarization beam combining/splitting film 41 corresponds to the polarization beam combining/splitting film 1 of the polarization beam combining/splitting structure 200. The optical waveguides WG41 and WG42 correspond to the optical waveguides WG1 and WG2 of the polarization beam combining/splitting structure 200, respectively. The optical waveguide WG41 is connected to the input port of the optical coupler OC12. The optical waveguide WG42 is connected to the input port of the optical coupler OC13. In FIG. 5, the optical waveguides WG41 and WG42 are schematically shown by lines.

The polarization beam combining/splitting structure 202 splits the light 10 by polarization into the TE light 11 and the TM light 12. The TE light 11 is input to the optical coupler OC12. The TM light 12 is input to the optical coupler OC13.

The polarization beam combining/splitting structure 203 includes a polarization beam combining/splitting film 43 and optical waveguides WG43 and WG44. The polarization beam combining/splitting film 43 corresponds to the polarization beam combining/splitting film 1 of the polarization beam combining/splitting structure 200. The optical waveguides WG44 and WG43 correspond to the optical waveguides WG1 and WG2 of the polarization beam combining/splitting structure 200, respectively. The optical waveguide WG43 is connected to the input port of the optical coupler OC14. The optical waveguide WG44 is connected to the input port of the optical coupler OC11. In FIG. 5, the optical waveguides WG43 and WG44 are schematically shown by lines.

The polarization beam combining/splitting structure 203 splits the local light 31 by polarization into local TE light and local TM light. The local TE light is input to the optical coupler OC11. The local TM light is input to the optical coupler OC14.

As a result, in the interference unit 33, the I component TE_I(0°) of the QPSK signal contained in the TE component of the light 10 is output from the optical waveguide WG21 or WG22. The Q component TE_Q(90°) of the QPSK signal contained in the TE component of the light 10 is output from the optical waveguide WG23 or WG24. Further, the I component TM_I(0°) of the QPSK signal contained in the TM component of the light 10 is output from the optical waveguide WG25 or WG26. The Q component TM_Q(90°) of the QPSK signal contained in the TM component of the light 10, is output from the optical waveguide WG27 or WG28, in the same manner as in the third exemplary embodiment.

As described above, in this configuration, as in the third exemplary embodiment, it is thereby possible to achieve a highly efficient light mixer with a low loss and a high polarization extinction ratio in a small size.

Fifth Exemplary Embodiment

Figure 6:
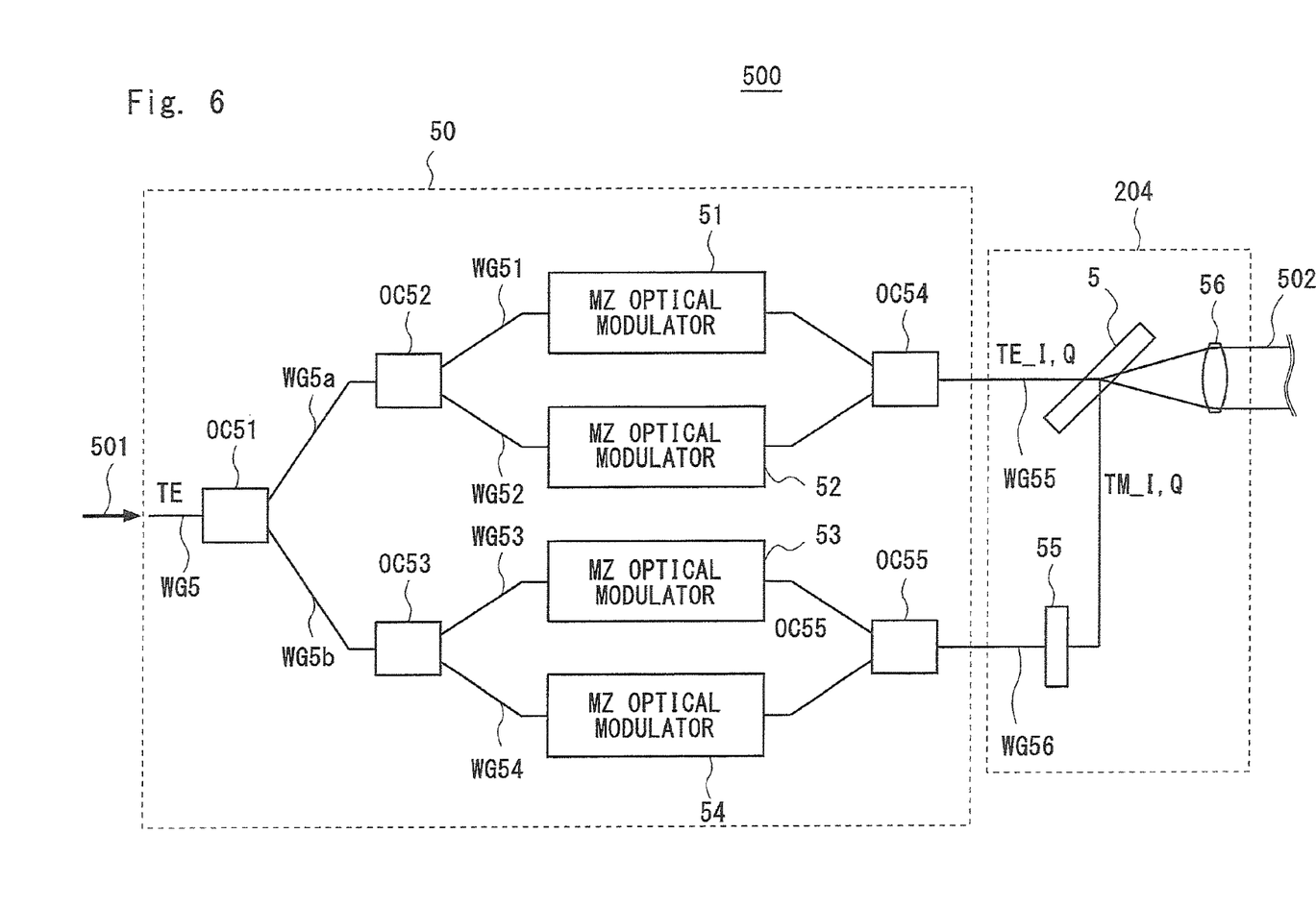
FIG. 6 is a diagram schematically showing a plan configuration of an optical modulator module 500 according to a fifth exemplary embodiment.

An optical modulator module 500 according to a fifth exemplary embodiment of the invention is described hereinafter. FIG. 6 is a diagram schematically showing a plan configuration of the optical modulator module 500 according to the fifth exemplary embodiment. The optical modulator module 500 generates a DP-QPSK signal. The optical modulator module 500 includes a polarization beam combining/splitting structure 204 and an optical modulation unit 50. The optical modulation unit 50 includes optical couplers OC51 to OC55, optical waveguides WG5, WG5a, WG5b, and WG51 to WG54, and MZ optical modulators 51 to 54. In FIG. 6, the optical waveguides WG5, WG5a, WG5b, and WG51 to WG56 are schematically shown by lines.

The optical couplers OC51 to OC55 are so-called Y branches. The optical coupler OC51 causes incident light 501 that enters the input port through the optical waveguide WG5 to branch off into two light beams. As the incident light 501, TE mode light is used. One of the branch incident light 501 is input to the input port of the optical coupler OC52 through the optical waveguide WG5a. The other one of the branch incident light 501 is input to the input port of the optical coupler OC53 through the optical waveguide WG5b.

One of the output ports of the optical coupler OC52 is connected to the input port of the MZ optical modulator 51 inserted on the optical waveguide WG51. The other one of the output ports of the optical coupler OC52 is connected to the input port of the MZ optical modulator 52 inserted on the optical waveguide WG52. One of the output ports of the optical coupler OC53 is connected to the input port of the MZ optical modulator 53 inserted on the optical waveguide WG53. The other one of the output ports of the optical coupler OC53 is connected to the input port of the MZ optical modulator 54 inserted on the optical waveguide WG54.

The output ports of the MZ optical modulators 51 and 52 are respectively connected to the input ports of the optical coupler OC54. The output ports of the MZ optical modulators 53 and 54 are respectively connected to the input ports of the optical coupler OC55.

The polarization beam combining/splitting structure 204 has the same configuration as the polarization beam combining/splitting structure 200 according to the second exemplary embodiment. The polarization beam combining/splitting structure 204 includes a polarization beam combining/splitting film 5 and optical waveguides WG55 and WG56. The polarization beam combining/splitting film 5 corresponds to the polarization beam combining/splitting film 1 of the polarization beam combining/splitting structure 200. The optical waveguides WG55 and WG56 correspond to the optical waveguides WG1 and WG2 of the polarization beam combining/splitting structure 200, respectively. The optical waveguide WG55 is connected to the output port of the optical coupler OC54. The optical waveguide WG56 is connected to the output port of the optical coupler OC55. A half-wave plate 55 is inserted to the optical waveguide WG56.

A modulation operation of the optical modulator module 500 is described hereinafter. The MZ optical modulator 51 outputs a modulated optical signal to the polarization beam combining/splitting film 5. The MZ optical modulator 52 outputs a modulated optical signal to the polarization beam combining/splitting film 5. Note that the light modulated by the MZ optical modulator 52 has a 90° phase difference from the light modulated by the MZ optical modulator 51. In other words, the light modulated by the MZ optical modulator 51 is the I component TE_I(0°) of the TE light of the QPSK signal, and the light modulated by the MZ optical modulator 52 is the Q component TE_Q(90°) of the TE light of the QPSK signal.

The MZ optical modulator 53 outputs a modulated optical signal to the polarization beam combining/splitting film 5. The MZ optical modulator 54 outputs a modulated optical signal to the polarization beam combining/splitting film 5. Note that the light modulated by the MZ optical modulator 54 has a 90° phase difference from the light modulated by the MZ optical modulator 53. In other words, the light modulated by the MZ optical modulator 53 and then transmits through the half-wave plate 55 is the I component TM_I(0°) of the TM light of the QPSK signal. The light modulated by the MZ optical modulator 54 and then transmits through the half-wave plate 55 is the Q component TM_Q(0°) of the TM light of the QPSK signal.

The polarization beam combining/splitting film 5 transmits the light (TE_I and TE_Q) from the MZ optical modulators 51 and 52 and reflects the light (TM_I and TM_Q) from the MZ optical modulators 53 and 54. The light (TE_I and TE_Q) from the MZ optical modulators 51 and 52 and the light (TM_I and TM_Q) from the MZ optical modulators 53 and 54 thereby enter the lens 56. As a result, a DP-QPSK signal 502 generated by the optical modulator module 500 is output from the lens 56.

As described above, with use of the polarization beam combining/splitting film 5, it is possible to generate an optical signal by combining a plurality of polarized light beams in a specific manner.

The present invention is not restricted to the above-described exemplary embodiments, and various changes and modifications may be made without departing from the scope of the invention. For example, although the case of using the DP-QPSK signal is described in the third to fifth exemplary embodiments above, a multiplexing technique for an optical signal is not limited thereto. A multiplexing technique different from the QPSK may be used as appropriate as long as polarization multiplexing is done.

Although the case of using the polarization beam combining/splitting structure is described in the third to fifth exemplary embodiments, the polarization beam combining/splitting structure can be replaced with the polarization beam combiner/splitter according to the first exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-060509, filed on Mar. 16, 2012, the disclosure of which is incorporated herein in its entirety by reference.

REFERENCE SIGNS LIST 1,5,43,44 POLARIZATION BEAM COMBINING/SPLITTING FILM
10 LIGHT
11,13 TE LIGHT
12 TM LIGHT
21,32,56 LENS
22,55 HALF-WAVE PLATE
31 LOCAL LIGHT
33 INTERFERENCE UNIT
34 PHASE DELAY MEANS
200~204 POLARIZATION BEAM COMBINING/SPLITTING STRUCTURE
50 OPTICAL MODULATION UNIT
51~54 MZ OPTICAL MODULATOR
100 POLARIZATION BEAM COMBINER/SPLITTER
101 SUBSTRATE
102 CLADDING LAYER
103 SPACE
104 GAP
105 INCIDENT END SURFACE
300,400 LIGHT MIXER
500 OPTICAL MODULATOR MODULE
501 INCIDENT LIGHT
502 DP-QPSK SIGNAL
701,703 OPTICAL WAVEGUIDE
702 POLARIZATION BEAM SPLITTING FILM
704 INCIDENT LIGHT
705 TM COMPONENT
706 TE COMPONENT
OC11~OC14,OC21~OC24,OC51~OC55 OPTICAL COUPLER
WG1~3,WG5,WG5A,WG5B,WG10~WG18, WG21~WG28,WG31,WG32, WG41~WG44,WG5, WG51~WG56 OPTICAL WAVEGUIDE

The invention claimed is:

1. A polarization beam combiner/splitter, comprising:
a substrate;
a polarization beam combining/splitting film placed on the substrate, for allowing a first polarization signal to pass through and causing a second polarization signal having a different polarization plane from the first polarization signal to branch off;
a first optical waveguide placed on the substrate, with an end surface facing a first surface of the polarization beam combining/splitting film and with a waveguide direction coinciding with a propagation direction of the first polarization signal; and
a second optical waveguide placed on the substrate, with an end surface facing a second surface on an opposite side of the first surface of the polarization beam combining/splitting film and with a waveguide direction coinciding with a propagation direction of the second polarization signal,
wherein the polarization beam combining/splitting film allows the first polarization signal contained in incident focused polarization multiplexed signal light to pass through and causing the second polarization signal to branch off, to split the polarization multiplexed signal light by polarization, and
wherein the first optical waveguide and the second optical waveguide are placed in closer proximity to a focal point of the focused polarization multiplexed signal light than a distance where a focal plane of the polarization multiplexed signal light is within the end surface of the first optical waveguide and the end surface of the second optical waveguide.

2. A polarization beam combining/splitting structure comprising:
the polarization beam combiner/splitter according to claim 1; and
a focusing unit that focuses the polarization multiplexed signal light at the distance where the focal plane of the polarization multiplexed signal light is within the end surface of the first optical waveguide and the end surface of the second optical waveguide.

3. A light mixer, comprising:
a first polarization beam combiner/splitter for splitting incident focused polarization multiplexed signal light by polarization into a first polarization signal and a second polarization signal having a different polarization plane from each other; and
an optical interferometer for separating the first polarization signal and the second polarization signal by phase, wherein
the first polarization beam combiner/splitter includes:
a substrate;
a first polarization beam combining/splitting film placed on the substrate, for allowing the first polarization signal to pass through and causing the second polarization signal to branch off;
a first optical waveguide placed on the substrate and connected to the optical interferometer, with an end surface facing a first surface of the first polarization beam combining/splitting film and with a waveguide direction coinciding with a propagation direction of the first polarization signal; and
a second optical waveguide placed on the substrate and connected to the optical interferometer, with an end surface facing a second surface on an opposite side of the first surface of the first polarization beam combining/splitting film and with a waveguide direction coinciding with a propagation direction of the second polarization signal, wherein the first polarization beam combining/splitting film allows the first polarization signal contained in the polarization multiplexed signal light to pass through and causing the second polarization signal to branch off, to split the polarization multiplexed signal light by polarization, and wherein the first optical waveguide and the second optical waveguide are placed in closer proximity to a focal point of the focused polarization multiplexed signal light than a distance where a focal plane of the polarization multiplexed signal light is within the end surface of the first optical waveguide and the end surface of the second optical waveguide.

4. The light mixer according to claim 3, wherein the optical interferometer causes each of the first and second polarization signals split by polarization through the first polarization beam combining/splitting film to interfere with local light and thereby outputs two signal light with a phase difference of $\pi/2$ from each of the first and second polarization signals.

5. The light mixer according to claim 4, wherein the local light is split into first local light and second local light, and
wherein the optical interferometer causes the first polarization signal to interfere with the first local light and causes the second polarization signal to interfere with the second local light.

6. The light mixer according to claim 5, wherein the first local light has the same polarization plane as the first polarization signal, and
wherein the second local light has the same polarization plane as the second polarization signal.

7. The light mixer according to claim 3, further comprising:
a first focusing unit that focuses the polarization multiplexed signal light at the distance where the focal plane of the polarization multiplexed signal light is within the end surface of the first optical waveguide and the end surface of the second optical waveguide.

8. The light mixer according to claim 6, further comprising:
a polarization plane rotation unit that is inserted into the second optical waveguide, for rotating the polarization plane of the second polarization signal to coincide with the polarization plane of the first local light.

9. The light mixer according to claim 8, wherein the first polarization signal comprises TE light,
the second polarization signal comprises TM light,
the first local light and the second local light comprise TE light, and
the polarization plane rotation unit comprises a half-wave plate.

10. The light mixer according to claim 9, further comprising:
a first focusing unit that focuses the polarization multiplexed signal light at a shorter distance from the end surface of the first optical waveguide and the end surface of the second optical waveguide where the focused polarization multiplexed signal light can be regarded as collimated light, wherein
the first polarization beam combiner/splitter, the first focusing means and the half-wave plate form a first polarization beam combining/splitting structure.

11. The light mixer according to claim 6, wherein the local light is split into first local light having the same polarization plane as the first polarization signal and second local light having the same polarization plane as the second polarization signal.

12. The light mixer according to claim 11, further comprising:
a second polarization beam combiner/splitter for splitting the local light into the first local light and the second local light by polarization, wherein
the second polarization beam combiner/splitter includes:
a second polarization beam combining/splitting film placed on the substrate, for allowing the first local light to pass through and causing the second local light to branch off;
a third optical waveguide placed on the substrate and connected to the optical interferometer, with an end surface facing a third surface of the second polarization beam combining/splitting film and with a waveguide direction coinciding with a propagation direction of the first local light; and
a fourth optical waveguide placed on the substrate and connected to the optical interferometer, with an end surface facing a fourth surface on an opposite side of the third surface of the second polarization beam combining/splitting film and with a waveguide direction coinciding with a propagation direction of the second local light.

13. The light mixer according to claim 12, wherein the third optical waveguide and the fourth optical waveguide are placed in closer proximity to a focal point of the focused local light than a distance where a focal plane of the local light is within the end surface of the third optical waveguide and the end surface of the fourth optical waveguide.

14. The light mixer according to claim 13, further comprising:
a second focusing unit that focuses the local light at a distance where the focal plane of the local light is within the end surface of the third optical waveguide and the end surface of the fourth optical waveguide, wherein
the second polarization beam combiner/splitter and the second focusing unit form a second polarization beam combining/splitting structure.

15. An optical modulator module, comprising:
an optical modulation unit for modulating and outputting a first polarization signal and a second polarization signal having a different polarization plane from each other; and
a polarization beam combiner/splitter for combining the first polarization signal and the second polarization signal,
wherein the polarization beam combiner/splitter includes:
a substrate;
a polarization beam combining/splitting film placed on the substrate, for allowing the first polarization signal output from the optical modulation unit to pass through and causing the second polarization signal to branch off;
a first optical waveguide placed on the substrate and connected to the optical modulation unit, with an end surface facing a first surface of the polarization beam combining/splitting film and with a waveguide direction coinciding with a propagation direction of the first polarization signal; and
a second optical waveguide placed on the substrate and connected to the optical modulation unit, with an end surface facing a second surface on an opposite side of the first surface of the polarization beam combining/splitting film and with a waveguide direction coinciding with a propagation direction of the second polarization signal, wherein the first and second optical waveguides are placed so that an optical axis of the first polarization signal having passed through the polarization beam combining/splitting film and an optical axis of the second polarization signal reflected by the polarization beam combining/splitting film coincide with each other, wherein the polarization beam combining/splitting film allows the first polarization signal contained in incident focused polarization multiplexed signal light to pass through and causing the second polarization signal to branch off, to split the polarization multiplexed signal light by polarization, and wherein the first optical waveguide and the second optical waveguide are placed in closer proximity to a focal point of the focused polarization multiplexed signal light than a distance where a focal plane of the polarization multiplexed signal light is within the end surface of the first optical waveguide and the end surface of the second optical waveguide.

16. A method for manufacturing a polarization beam combiner/splitter, comprising:

forming a first optical waveguide with an end surface facing a first surface of a polarization beam combining/splitting film for allowing a first polarization signal to pass through and causing a second polarization signal having a different polarization plane from the first polarization signal to branch off and with a waveguide direction coinciding with a propagation direction of the first polarization signal on a substrate prior to placing the polarization beam combining/splitting film;

forming a second optical waveguide with an end surface facing a second surface on an opposite side of the first surface of the polarization beam combining/splitting film and with a waveguide direction coinciding with a propagation direction of the second polarization signal on the substrate prior to placing the polarization beam combining/splitting film; and placing the polarization beam combining/splitting film on the substrate, wherein the polarization beam combining/splitting film allows the first polarization signal contained in incident focused polarization multiplexed signal light to pass through and causing the second polarization signal to branch off, to split the polarization multiplexed signal light by polarization, and wherein the first optical waveguide and the second optical waveguide are placed in closer proximity to a focal point of the focused polarization multiplexed signal light than a distance where a focal plane of the polarization multiplexed signal light is within the end surface of the first optical waveguide and the end surface of the second optical waveguide.

* * * * *